Figure 1:
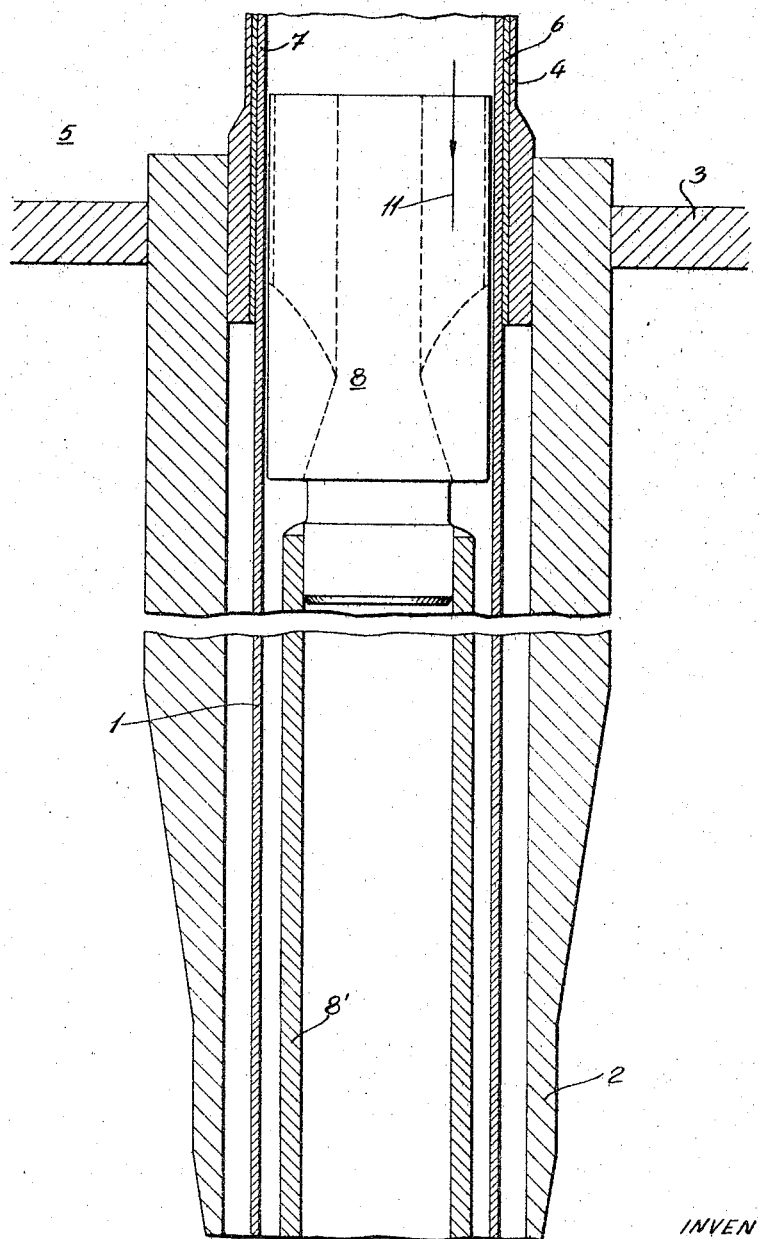

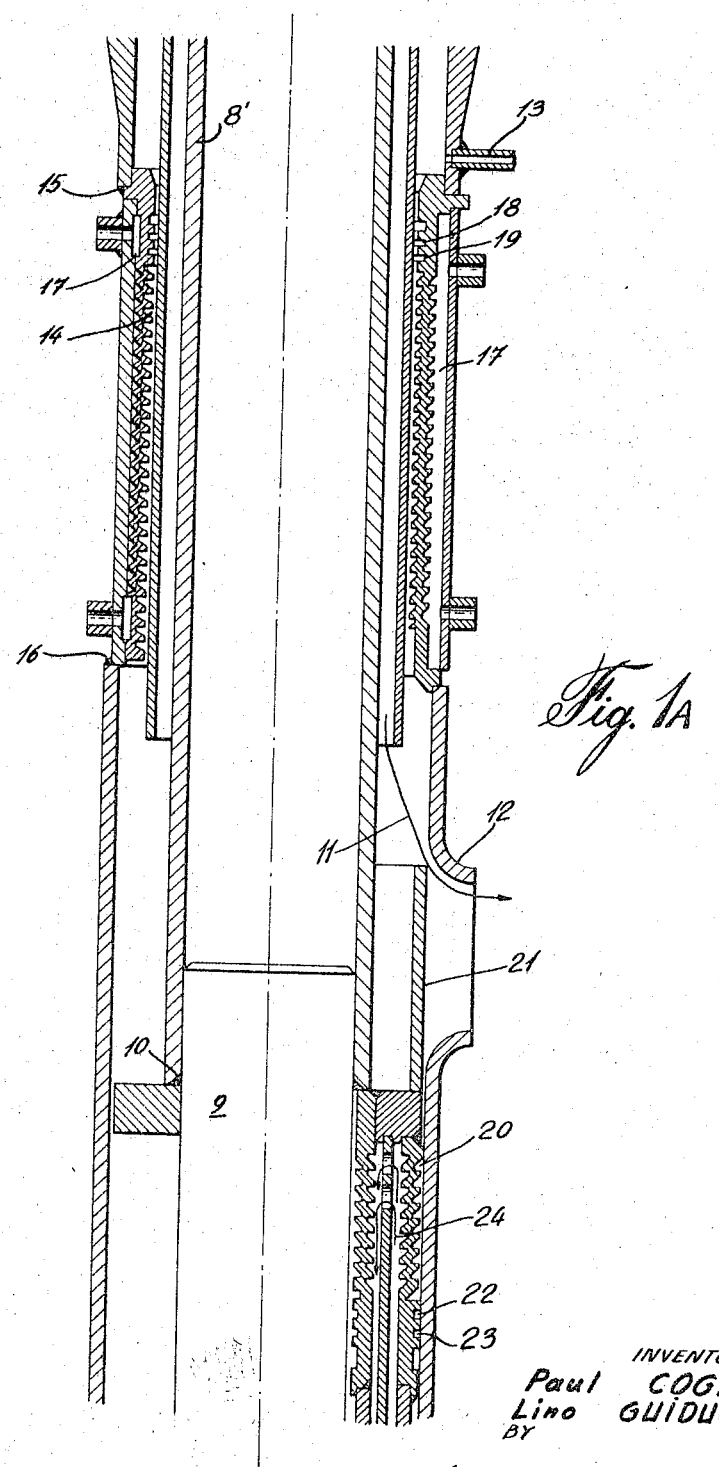

3,309,281
TIGHT PASSAGE AT THE END OF A CHANNEL OF A NUCLEAR REACTOR COOLED BY AN ORGANIC LIQUID
Paul Cogez, Montrouge, France, and Lino Guiducci, Leval, Belgium, assignors to European Atomic Energy Community (Euratom), Brussels, Belgium
Filed Mar. 2, 1964, Ser. No. 348,421
Claims priority, application Belgium, Mar. 13, 1963, 503,802
1 Claim. (Cl. 176—64)

The present invention relates to a device providing for the tight passage of tubes or rods at the end of a channel of a nuclear reactor cooled by an organic liquid. More particularly, although not exclusively, the invention relates to such a passage through the lower end of a channel of a nuclear reactor cooled by a liquid capable of solidifying at ambient temperature as is the case with a mixture of polyphenyls for instance.

The specific joint used in the tight passage of the invention is of the type disclosed in Belgian application No. 503,366, filed Mar. 1, 1963 and issued as Belgian Patent No. 629,082. This patent corresponds to U.S. application No. 367,910.

As is known, a nuclear reactor comprises a certain number of generally vertical channels within which elements of fissile material are mounted and within which a heat-carrying fluid flows which is adapted to absorb the heat generated by these elements to thereafter give it up in a heat exchanger. In the case of a thermal neutron reactor, all of these channels are housed in a moderator such as graphite, heavy or light water for instance.

It is also known that the elements of fissile material must be withdrawn from the reactor after having been subjected to the fission reactions and replaced by new elements. It is obviously imperative that the loading and unloading operations be carried out with the minimum of disturbance in the reactor and if possible without stopping the operation thereof.

It has already been thought to change the fuel elements by removing them from the channels by their upper end but it is then necessary to introduce into each channel grippers hanging from a rope and adapted to grasp each element. The grippers and cable are then heavily irradiated and must remain sheltered within the protective shield.

On the other hand, the channel of a nuclear reactor must be able to ensure tightness and thermal insulation of the heat-carrying fluid relatively to the moderator: in reactors having a liquid moderator, the tightness is obtained by means of two concentric metallic tubes: the pressure tube which resists the pressure differential, and the calandria tube. The two tubes are generally insulated by a layer of gas.

According to the invention, a tight passage at the end of a channel of a nuclear reactor cooled by an organic liquid comprises a first joint mounted at the base of the pressure tube, between the latter and the calandria tube, or an extension thereof secured to the reactor tank, and a second joint mounted between a vertical metallic rod, providing support for the fuel elements at the base of the channel, and the said extension secured to the tank: both joints being of the type which depends on the solidification (at the ambient or at the normal working temperature) of the liquid packing material used.

According to the invention, the first such joint is secured to the calandria tube or an extension thereof secured to the tank, and the second such joint is movable longitudinally and/or in rotation between the said vertical supporting rod and the said extension.

Again according to the invention, the said second joint is integral with a hatch adapted to more or less close the outlet of the heat-carrying organic liquid, the said outlet being provided at the base of the channel in the said calandria tube extension integral with the tank.

Preferably, each of such joints is provided, at the downstream end in relation to the direction of flow of the organic liquid, with one or several scraping rings.

There will, hereinafter, be described two different embodiments of the invention with reference to the appended drawing wherein FIGURES 1 and 1a show consecutive coaxial parts and illustrate two axial cross-section half views of the base of a nuclear reactor channel provided with a tight passage in accordance with the instant invention.

The figure of drawing illustrates the lower end of a pressure tube 1 made of fritted aluminum. The base of this tube is surrounded outwardly by a cylindrical sheath 2 integrally secured to tank 3 of the reactor and acting as an extension of the zirconium calandria tube 4. At the top of the drawing, are illustrated the moderator liquid 5 and an annular fixing layer 6 between pressure tube 1 and calandria tube 4. Fuel elements of uranium carbide, such as 7, are layed on a metallic support 8 extended downwardly by means of a tubular part 8' and a vertical rod 9 to which it is welded, as at 10. The organic heat carrying liquid 11 flows from top to bottom inside power tube 1 and around the fuel elements to come out by piping 12. A scavenging thermal insulating gas is injected at 13 and distributed in the annular layer 6.

According to the invention, a first joint 14 which depends for its operation on a change, at ambient temperature, in the solidification of the packing material used therein and essentially constituted by an undulated or waving partition, is located at and surrounds the base of pressure tube 1, between the latter and sheath 2 which extends the calandria tube 4 itself integrated to tank 3, as aforesaid. This joint is secured to sheath 2 at 15 and 16 and is cooled by water circulation 17 or 17', according to the two embodiments illustrated in the two half views in cross-section. The joint also comprises two scraping rings 18 and 19 at the upper end thereof located downstream of direction of flow of the heat-carrying organic liquid 11. These segments provide a supplementary safety to the joint.

Also according to the invention, a second joint 20, the operation of which depends also on a change, at ambient temperature, in the solidification of the packing material used therein, essentially made up of two undulated or waving partitions (illustrated only on the rightward half cross-section in the drawing) is mounted between the vertical supporting rod 9 and the sheath 2 integrated to tank 3. This latter joint is movable longitudinally and in rotation between rod 9 and sheath 2 and is integral with a hatch 21 capable of more or less closing outlet 12 of organic liquid 11. This hatch allows a regulation of organic liquid flow according to thermodynamic needs of the reactor.

Joint 20 comprises also two scraping rings 22 and 23 at its lower end which is located downwardly in the direction of flow of the organic liquid. These segments provide a supplementary safety to the joint. The joint is cooled by a hair-pin type water circulating system 24.

The essential advantage to be derived from the invention resides in the fact that it makes it possible to unload the fuel elements by pushing them from the lower end by means of a simple jack introduced in the tight passage, this method making it possible to grab them with a gripper above the very radioactive part at the heart of the reactor.

It is to be understood that the invention is not to be limited to the specific embodiment just described but also embraces various other embodiments within the scope of the invention. Thus, it is possible to use other types of joints which are based on a change in the solidification of the packing material, such as those used without cooling, etc.

We claim:

A tight passage at the end of a channel of a nuclear reactor having a moderator tank and cooled by an organic liquid, said passage comprising:

a calandria tube in said tank, having an extension thereof projecting out of the tank and secured thereto;

a pressure tube within said calandria tube;

a first tightness joint, including a packing material capable of a change in the solidification thereof at ambient temperature; said first joint being mounted at the base of said power tube secured to the said calandria tube extension, between the said two tubes;

fuel elements within said power tube and support means at the base of said pressure tube for supporting said fuel elements in said pressure tube; said support means including a vertical rod at least partly outside said pressure tube and in said calandria tube extension; and a second tightness joint, including a packing material capable of a change in the solidification thereof at ambient temperature; said second joint being movable between said vertical rod and said calandria tube extension, an outlet provided through said calandria tube extension below said pressure tube and between said first and second joint for the flow of a heat-carrying organic fluid, said second joint being provided with a hatch for controlling the flow of the said fluid.

References Cited by the Examiner

UNITED STATES PATENTS

| 2,977,297 | 3/1961 | Evans et al. | 176—52 |
| 3,079,321 | 2/1963 | Oppenheimer et al. | 176—52 |
| 3,193,469 | 7/1965 | Bradley et al. | 176—64 |

FOREIGN PATENTS

| 629,082 | 9/1963 | Belgian. |
| 1,338,441 | 10/1963 | France. |

L. DEWAYNE RUTLEDGE, *Primary Examiner.*

BENJAMIN R. PADGETT, *Examiner.*